United States Patent
Hinker et al.

(10) Patent No.: US 6,647,546 B1
(45) Date of Patent: Nov. 11, 2003

(54) AVOIDING GATHER AND SCATTER WHEN CALLING FORTRAN 77 CODE FROM FORTRAN 90 CODE

(75) Inventors: Paul J. Hinker, Longmont, CO (US); Michael Boucher, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/563,429

(22) Filed: May 3, 2000

(51) Int. Cl.[7] .............................. G06F 9/45; G06F 9/54; G06F 9/46; G06F 9/455

(52) U.S. Cl. .................... 717/137; 717/151; 717/152; 709/310; 709/313; 703/23; 703/26; 703/27

(58) Field of Search ................................. 717/137, 151, 717/152; 709/310, 313; 703/23, 26, 27

(56) References Cited

U.S. PATENT DOCUMENTS

| | | |
|---|---|---|
| 4,675,832 A | 6/1987 | Robinson et al. |
| 4,685,082 A | 8/1987 | Cheung et al. |
| 4,812,996 A | 3/1989 | Stubbs |
| 5,073,851 A | 12/1991 | Masterson et al. |
| 5,075,847 A | 12/1991 | Fromme |

(List continued on next page.)

FOREIGN PATENT DOCUMENTS

| | | |
|---|---|---|
| DE | 199 34 515 A1 | 1/2000 |
| EP | 0 703 534 A | 3/1996 |
| EP | 0 817 044 A2 | 1/1998 |
| EP | 0 965 921 A2 | 12/1999 |
| EP | 1 024 432 A | 8/2000 |
| EP | 1 081 585 A | 3/2001 |
| FR | 2 793 908 A1 | 11/2000 |
| GB | 2 343 029 | 4/2000 |
| GB | 2 357 873 | 4/2001 |
| JP | 03-282731 A | 12/1991 |
| JP | 07-056716 A | 3/1995 |
| WO | WO 99/10812 A | 3/1999 |

OTHER PUBLICATIONS

Metcalf, M., "convert.f90", CERN, Geneva 1991, 1997, p. 1–27, ftp://ftp.numerical.rl.ac.uk/pub/MandR/convert.f90.*

Handy, Jim, "The Cache Memory Book", Second Edition, Choosing Cache Policies, Copyright 1998, pp. 55, 66, 67, 155.

"dcpid—Digital Continuous Profiling Infrastructure daemon", Man pp. for SCR–Installed Programs (Alpha/NT), Online <URL:http://research.compaq.com/SRC/dcpi/html/ntalpha/dcpi.html>, 1997, pp. 1–6.

Browne et al., "PAPI: Portable Interface to Hardware Performance Counters," Cewes Major Shared Resources Center Pet Technical Reports, vol. 99–06, 1999, Online, <URL:http://www.wes.hpc.mil/pet/tech_reports/reports/pdf/tr_9906.pdf>, pp. 3–13.

(List continued on next page.)

*Primary Examiner*—Kakali Chaki
*Assistant Examiner*—Qamrun Nahar
(74) *Attorney, Agent, or Firm*—Finnegan, Henderson, Farabow, Garrett & Dunner, L.L.P.

(57) ABSTRACT

In accordance with methods and systems consistent with the present invention, a system that automatically generates Fortran 90 interfaces to Fortran 77 code is provided. These interfaces provide for the use of optional parameters and, because they are written in Fortran 90, also allow for parameter checking. These interfaces are automatically generated to allow a programmer to reap the benefits of Fortran 90 calling without having to rewrite the Fortran 77 underlying code. When generating the interfaces, the method performs an optimization that saves a significant amount of processing time as well as a significant amount of memory. This optimization involves generating the interfaces in such a way as to prevent the compiler from performing a gather and a scatter.

24 Claims, 9 Drawing Sheets

U.S. PATENT DOCUMENTS

| | | | |
|---|---|---|---|
| 5,079,707 A | | 1/1992 | Bird et al. |
| 5,119,465 A | * | 6/1992 | Jack et al. .................. 717/137 |
| 5,146,593 A | * | 9/1992 | Brandle et al. ............. 709/317 |
| 5,179,702 A | | 1/1993 | Spix et al. |
| 5,274,813 A | | 12/1993 | Itoh |
| 5,297,274 A | | 3/1994 | Jackson |
| 5,301,312 A | | 4/1994 | Christopher, Jr. et al. |
| 5,325,499 A | | 6/1994 | Kummer et al. |
| 5,325,533 A | | 6/1994 | McInerney et al. |
| 5,353,401 A | | 10/1994 | Iizawa et al. |
| 5,390,314 A | * | 2/1995 | Swanson .................... 717/138 |
| 5,438,659 A | | 8/1995 | Notess et al. |
| 5,485,619 A | * | 1/1996 | Lai et al. .................... 717/150 |
| 5,499,349 A | | 3/1996 | Nikhil et al. |
| 5,500,881 A | | 3/1996 | Levin et al. |
| 5,519,866 A | | 5/1996 | Lawrence et al. |
| 5,530,816 A | | 6/1996 | Holt |
| 5,553,235 A | | 9/1996 | Chen et al. |
| 5,613,063 A | | 3/1997 | Eustace et al. |
| 5,636,374 A | | 6/1997 | Rodgers et al. |
| 5,673,387 A | | 9/1997 | Chen et al. |
| 5,675,790 A | | 10/1997 | Walls |
| 5,675,802 A | | 10/1997 | Allen et al. |
| 5,689,712 A | | 11/1997 | Heisch |
| 5,696,937 A | | 12/1997 | White et al. |
| 5,710,727 A | | 1/1998 | Mitchell et al. |
| 5,724,262 A | | 3/1998 | Ghahramani |
| 5,742,793 A | | 4/1998 | Sturges et al. |
| 5,745,897 A | | 4/1998 | Perkins et al. |
| 5,748,961 A | | 5/1998 | Hanna et al. |
| 5,761,426 A | | 6/1998 | Ishizaki et al. |
| 5,774,724 A | | 6/1998 | Heisch |
| 5,784,698 A | | 7/1998 | Brady et al. |
| 5,787,285 A | | 7/1998 | Lanning |
| 5,787,480 A | | 7/1998 | Scales et al. |
| 5,805,795 A | | 9/1998 | Whitten |
| 5,835,705 A | | 11/1998 | Larsen et al. |
| 5,850,554 A | | 12/1998 | Carver |
| 5,860,024 A | | 1/1999 | Kyle et al. |
| 5,864,867 A | | 1/1999 | Krusche et al. |
| 5,867,649 A | | 2/1999 | Larson |
| 5,872,977 A | | 2/1999 | Thompson |
| 5,905,488 A | | 5/1999 | Demers et al. |
| 5,905,856 A | | 5/1999 | Ottensooser |
| 5,913,223 A | | 6/1999 | Sheppard et al. |
| 5,920,895 A | | 7/1999 | Perazzoli, Jr. et al. |
| 5,940,616 A | | 8/1999 | Wang |
| 5,963,975 A | | 10/1999 | Boyle et al. |
| 5,974,536 A | | 10/1999 | Richardson |
| 5,978,892 A | | 11/1999 | Noel et al. |
| 5,991,708 A | | 11/1999 | Levine et al. |
| 5,991,893 A | | 11/1999 | Snider |
| 6,006,031 A | * | 12/1999 | Andrews et al. ............ 717/137 |
| 6,009,514 A | | 12/1999 | Henzinger et al. |
| 6,014,517 A | | 1/2000 | Shagam et al. |
| 6,016,474 A | | 1/2000 | Kim et al. |
| 6,018,793 A | | 1/2000 | Rao |
| 6,023,583 A | | 2/2000 | Honda |
| 6,044,438 A | | 3/2000 | Olnowich |
| 6,049,798 A | | 4/2000 | Bishop et al. |
| 6,052,708 A | | 4/2000 | Flynn et al. |
| 6,055,368 A | | 4/2000 | Kunioka |
| 6,065,019 A | | 5/2000 | Ault et al. |
| 6,072,951 A | | 6/2000 | Donovan et al. |
| 6,077,312 A | | 6/2000 | Bates et al. |
| 6,081,868 A | | 6/2000 | Brooks |
| 6,085,029 A | | 7/2000 | Kolawa et al. |
| 6,098,169 A | | 8/2000 | Ranganathan |
| 6,101,325 A | * | 8/2000 | Flaat ......................... 717/136 |
| 6,101,525 A | | 8/2000 | Hecker |
| 6,119,198 A | | 9/2000 | Fromm |
| 6,125,430 A | | 9/2000 | Noel et al. |
| 6,141,692 A | | 10/2000 | Loewenstein et al. |
| 6,167,565 A | * | 12/2000 | Kanamori ................... 717/146 |
| 6,173,327 B1 | | 1/2001 | De Borst et al. |
| 6,205,537 B1 | | 3/2001 | Albonesi |
| 6,223,134 B1 | | 4/2001 | Rust et al. |
| 6,253,252 B1 | | 6/2001 | Schofield |
| 6,263,485 B1 | | 7/2001 | Schofield |
| 6,269,457 B1 | | 7/2001 | Lane |
| 6,286,130 B1 | | 9/2001 | Poulsen et al. |
| 6,304,951 B1 | | 10/2001 | Mealey et al. |
| 6,311,320 B1 | | 10/2001 | Jibbe |
| 6,314,429 B1 | * | 11/2001 | Simser ....................... 717/137 |
| 6,317,871 B1 | * | 11/2001 | Andrews et al. ............ 717/137 |
| 6,351,845 B1 | | 2/2002 | Hinker et al. |
| 6,438,745 B1 | * | 8/2002 | Kanamaru et al. .......... 717/137 |
| 6,480,818 B1 | | 11/2002 | Alverson et al. |
| 6,496,902 B1 | | 12/2002 | Faanes et al. |
| 6,523,090 B2 | | 2/2003 | Tremblay |
| 2001/0051974 A1 | | 12/2001 | Saad |
| 2002/0046201 A1 | | 4/2002 | Hembry |
| 2002/0078010 A1 | | 6/2002 | Ehrman et al. |

OTHER PUBLICATIONS

IBM Technical Disclosure Bulletin, "Internal Performance Measurement Counters," IBM Corp., vol. 34, No. 4A, Sep. 1991, pp. 51–52 (the whole document).

IBM Technical Disclosure Bulletin, "Simultaneous Viewing of Performance Monitor Data Independent of Counters," IBM Corp., vol. 39, No. 10, Oct. 1996, pp. 181–183.

Zagha et al., "Performance Analysis Using the Analysis Using the MIPS R10000 Performance Counters", SC96 Technical Papers, Online, Oct. 8, 1998, pp. 1–22 <URL:http://www.supercomp.org/sc96/proceedings/SC96PROC/ZAGH/INDEX.HTM>, Nov. 1996, pp. 1–22.

"Algorithm Visualization System: Introduction," available online at: www.cp/eng.chula.ac.th/faculty/spj/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587–590.

"GeoMAMOS Project Home Page," available online at: www.ece.nwu.edu/~theory/geomamos.html as of Jun. 10, 1999, 4 pages.

"Introduction," available online at: www.ece.nwu.edu/~theory/gs_tech_1_html/section3_1.html as of Jun. 10, 1999, 3 pages.

"Pentium Processor Family User Manual vol. 3: Architecture and Programming Manual," pp. 25–182, 25–183, 25–309, and 25–310, Intel Corp., (1994).

"Purify for Windoes NT, Product Overview," Ver. 6.0, available online at: www.rational.com/products.puify_nt/prodinfo/index.jtmpl as of Jan. 11, 1999, 3 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theorys/gs_tech_1_html/section3_3.html as of Jun. 10, 1999, 2 pages.

Attali et al., "Semantic–Based Visualization for Parallel Object–Oriented Programming," Proceedings of the 11th Annual Conference on Object Oriented Programing Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture," Morgan Kaufman Publishers, Inc., San Francisco, California, 1999.

Ian Foster, "Designing and Building Parallel Programs," Addison–Wesley Publishing Company, 1995.

Kevin Dowd and Charles R. Severance, "High Performance Computing," Second Edition, Chapter 10, Shared Memory Multiprocessors, Aug. 1998, pp. 216–218.

Sun Microsystesms Computer Company, "Prism 5.0 Reference Manual," Revision A., Nov. 1997.

Sun Microsystems, "UltraSPARC User's Manual," UltraSPARC–1, UltraSPARC–II, Jul. 1997, pp. 319–325.

Wasserman et al., "A Graphical, Extensible Integrated Environment for Software Development," Proceedings of the ACD SRHDOG/SIGPLAN Software Engineering Symposium on Practical Software Development Environments, 1986, pp. 131–142.

IBM Technical Disclosure Bulletin, "Caching Objects in a Data Space," Oct. 1, 1994, vol. No. 37, pp. 587–590.

Microsoft Press,"Microsoft Press Computer Dictionary: Third Edition", 1997, p. 101.

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

Haggander et al., "Optimizing Dynamic Memory Mangement in a Multithreaded Application Executing on a Multiprocessor," International Conference on Parallel Processing, 1998, Minneapolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

Nathan P. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pps. 230–239.

Valvano, "Debugging Strategies," Chapter 6, pps. 6.1–6.10, Real Time Debugging, Online Manual, Jun. 7, 1999, Retrieved from the Internet: <URL:http://ece.utexas.edu/ {valvano/EE360P/PDF/Ch6.pdf>.

* cited by examiner

AVOIDING GATHER AND SCATTER WHEN CALLING FORTRAN 77 CODE FROM FORTRAN 90 CODE

FIELD OF THE INVENTION

The present invention relates generally to data processing systems and, more particularly, to avoiding gather and scatter when calling Fortran 77 code from Fortran 90 code.

BACKGROUND OF THE INVENTION

Before 1990, programmers wrote enormous amounts of code in the Fortran 77 (F77) programming language, which is a fixed parameter language, meaning that each call to a particular subprogram (e.g., a subroutine or a function) contains the same list of parameters. For example, the subprogram SASUM (N, A, Inca) requires three parameters, each of which must be specified every time the subprogram is called. In this example, "N" indicates the length of A, "A" is an array pointer, and "Inca" indicates the stride of A, which is the relative offset within the array for each element to be operated upon. The SASUM subprogram sums the elements of array A at the Inca stride. Thus, for example, if the stride were 2, every second element (e.g., elements A[1], A[3], A[5], etc.) would be summed.

In 1990, the Fortran 90 (F90) language was developed as an improvement over the F77 language by providing a number of additional features, including optional parameters and parameter checking. The use of optional parameters allows a programmer to use different parameter lists to invoke the same subprogram. For example; the following three subprogram calls invoke the same subprogram, even though the number of parameters differs:

Total=SASUM (grades)

Total=SASUM (N, grades)

Total=SASUM (N, grades, Inca)

F90's parameter checking feature determines whether the types of the parameters are appropriate, whether the number of parameters in the parameter list is appropriate, and whether the shape of the parameters is appropriate. The "shape" of a parameter refers to the dimensionality of the parameter. For example, a two-dimensional array has a shape of 2D.

Although F90 provides a number of beneficial features, because there is so much existing code written in F77, it is cost prohibitive to rewrite all of the F77 code. Therefore, it is desirable to facilitate the use of F77 code from F90 code.

SUMMARY OF THE INVENTION

In accordance with methods and systems consistent with the present invention, a system that automatically generates F90 interfaces to F77 code is provided. These interfaces provide for the use of optional parameters and, because they are written in F90, also allow for parameter checking. These interfaces are automatically generated to allow a programmer to reap the benefits of F90 calling without having to rewrite the F77 underlying code. Furthermore, when generating the interfaces, methods and systems consistent with the present invention perform an optimization that both saves a significant amount of processing time and saves memory.

In accordance with an implementation consistent with the present invention, a method is provided in a data processing system containing a subprogram written in a first programming language. The subprogram receives a parameter in a form suitable for the first programming language. and converts the parameter to a form suitable for a second programming language that is different from the first programming language. The form suitable for the second programming language prevents a compiler from generating code to gather the parameter when the subprogram is compiled by the compiler. Furthermore, the subprogram invokes another subprogram written in the second programming language and passes the parameter in the form suitable for the second programming language.

In another implementation, a method is provided in a data processing system containing a program written in a first programming language. The program expresses a parameter written in a form suitable for the first programming language in a form suitable for a second programming language that is different from the first programming language. The form suitable for the second programming language prevents a compiler during compilation from generating code to gather the parameter. Furthermore, the program invokes code written in the second programming language using the parameter in the form suitable to the second programming language.

In yet another implementation, a computer-readable memory device is provided that is encoded with a program written in a first programming language. that passes first arrays as arguments by specifying dope vectors for the first arrays. The computer-readable memory device is also encoded with a subprogram written in a second programming language that receives second arrays as arguments by the arguments referring to memory addresses of the second arrays, wherein the program passes a passed array as a parameter to the subprogram by specifying a reference to a memory address of the passed array.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Figure 1:
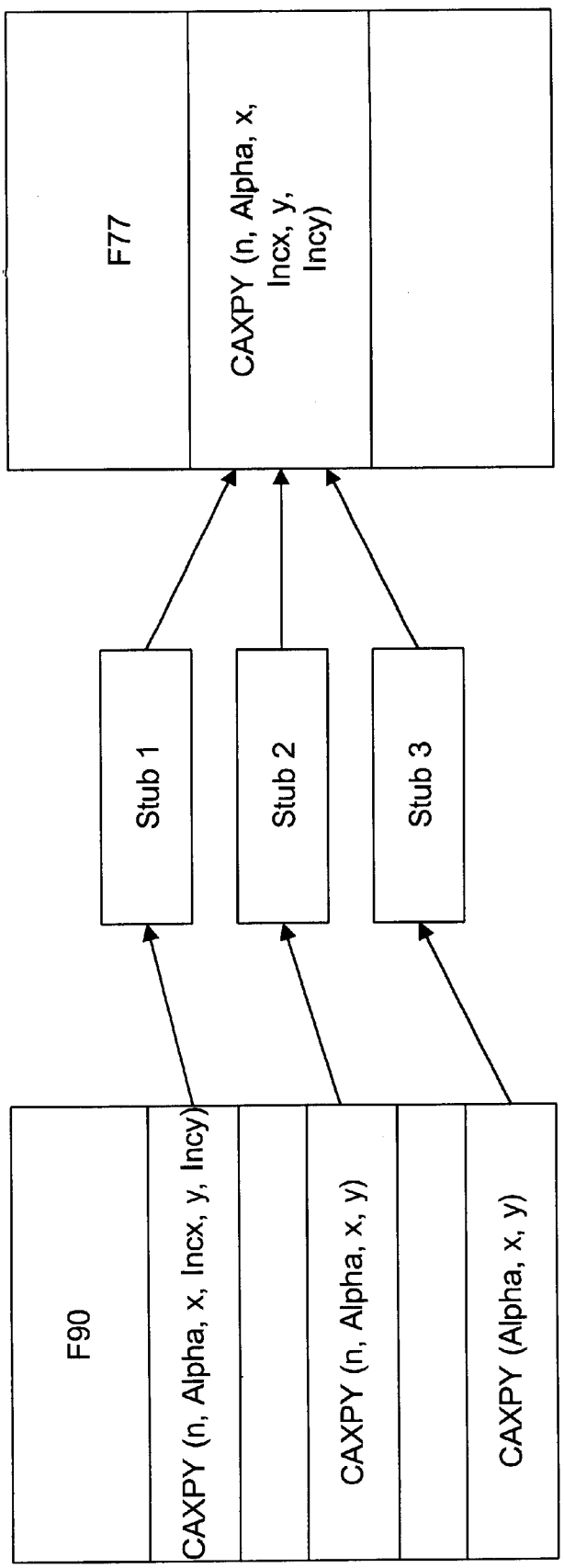
FIG. 1 depicts a number of subprogram calls utilizing stubs to invoke the same underlying subprogram in accordance with methods and systems consistent with the present invention.

In accordance with methods and systems consistent with the present invention, an automatic method of generating F90 interfaces to F77 code is provided. This method allows callers to invoke one of the F90 interfaces to call the underlying F77 code, thus enabling them to take advantage of the benefits of F90 without having to rewrite the F77 code. As a result, the caller gains the benefit of parameter checking and the use of optional parameters. When generating the interfaces, the method performs an optimization that saves a significant amount of processing time as well as a significant amount of memory. This optimization involves generating the interfaces in such a way as to prevent the compiler from performing a gather and a scatter, both of which are described in further detail below.

Overview

Methods and systems consistent with the present invention provide a script that scans the F77 source code and that generates an interface file for each subprogram. This file defines the signature for the associated subprogram, including its name, its parameters, and each parameter's type. This script then scans the F77 source code again and inserts code-generator statements into each interface file. These code-generator statements provide meaningful information, such as characteristics of the parameters, to facilitate the automatic generation of F90 interfaces. After the code-generator statements are added, another script is run that reads each interface file and automatically generates a number of stubs, each of which is a routine that serves as an F90 interface to the F77 subprogram. A stub is generated for each legal parameter combination for each subprogram. A legal parameter combination is a combination of parameters in which the specified parameters can uniquely identify any appropriate stub routine and values for the missing parameters can be generated. Thus, for a given F77 subprogram, a number of stubs will be generated including one with a full parameter list and one for each legal parameter combination, in which fewer than all of the parameters are specified. In this manner, the caller has the flexibility of invoking any of the stubs to invoke the F77 subprogram and may thus use fewer than all the parameters normally required by the F77 subprogram.

When generating the stubs, the script creates them in such a way as to avoid gather and scatter. In F90, arrays are referenced using a dope vector, which indicates the array's address, its length, and its stride. Thus, when F90 code passes an array as a parameter, it actually passes a reference to the array's dope vector. Non-F90 code, however, cannot typically handle such references. So, when the F90 code contains statements to call a non-F90 subprogram and pass an array as a parameter, during compilation of the F90 code, the compiler generates code to store the array in contiguous memory ("gather") and to pass a pointer to the contiguous memory as a reference to the array instead of using the dope vector. The compiler also generates code to return the array to its pre-gather stride ("scatter") upon return from the subprogram. The script in accordance with methods and systems consistent with the present invention constructs the stubs so as to prevent the compiler from generating code for the gather and scatter, thus saving significant processing time.

When the caller makes a subprogram call, the corresponding stub is invoked, which generates values for any parameters missing from the call, because F77 cannot handle optional parameters. Then, the stub invokes the appropriate F77 subprogram. Regardless of which stub of the F77 subprogram is invoked, the F77 subprogram is ultimately invoked. Thus, the caller may take advantage of the benefits of F90 calling, but the F77 code need not be rewritten. For example, in FIG. 1, three F90 subprogram calls contain different parameter lists. Each call invokes a particular stub that will insert the missing parameters, if any, and then call the F77 subprogram. In this manner, the programmer of the F90 code can take advantage of the optional parameter passing and type checking provided by F90 without having to rewrite the F77 code.

Implementation Details

Figure 2:
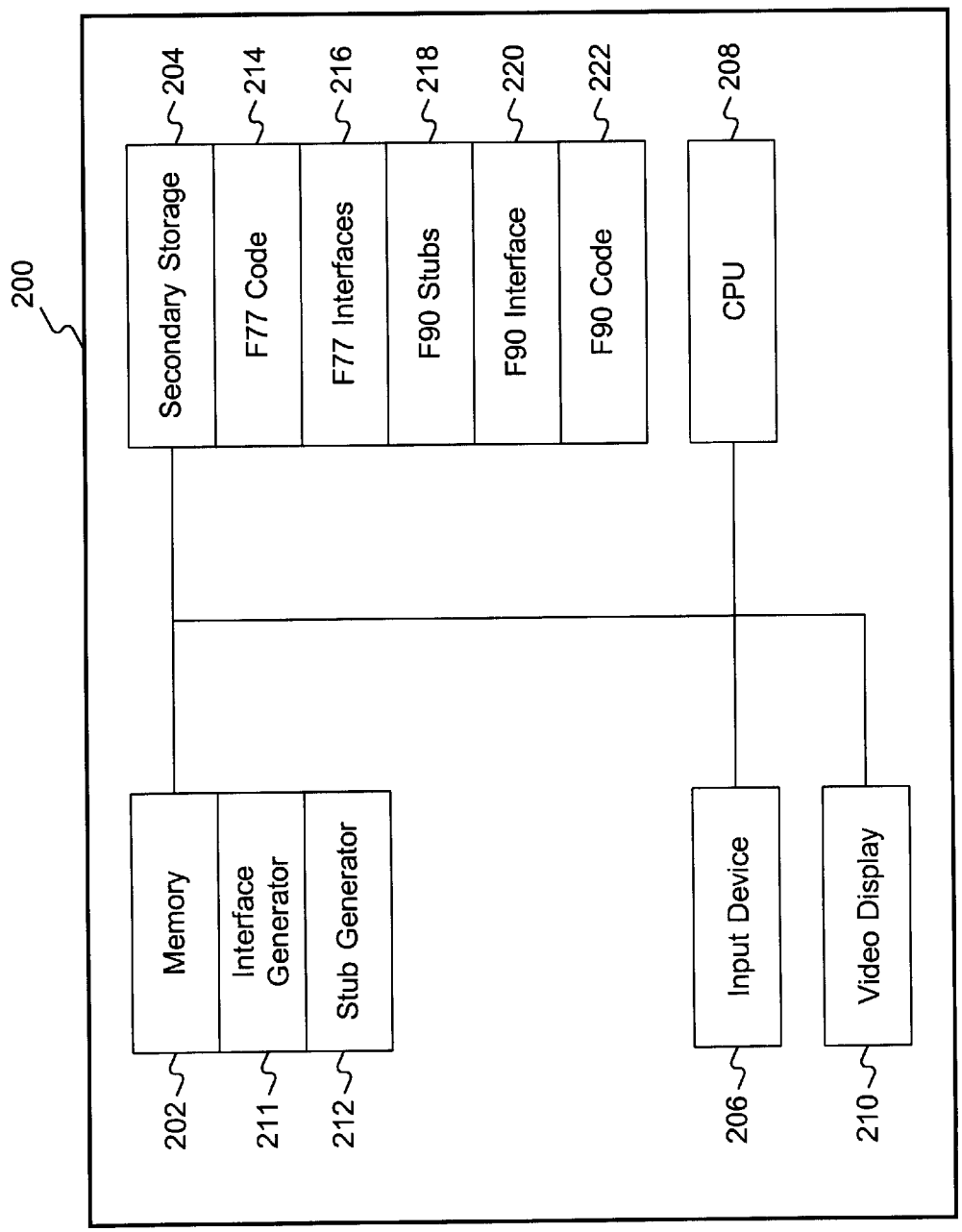
FIG. 2 depicts a data processing system suitable for use with methods and systems consistent with the present invention.

FIG. 2 depicts a data processing system 200 suitable for use with methods and systems consistent with the present. Data processing system 200 includes a memory 202, a secondary storage device 204, an input device 206, a central processing unit (CPU) 208, and a video display 210. In the memory 202 resides an interface generator 211 and a stub generator 212. Interface generator 211 reads F77 source code 214 and generates F77 interface files 216, one for each subprogram encountered in the source code. Stub generator 212 reads F77 interface files 216 and generates both F90 stubs 218 and F90 interface 220 so that F90 code 222. can utilize the F90 stubs to invoke the F77 code. F90 interface 220 provides declarations for F90 stubs 218 to enable the compilation of F90 code 222.

Following is the definition of the F77 interface file, where the words INTERFACE, SUBROUTINE, FUNCTION, and END are keywords and the word TYPE represents any valid Fortran type (i.e., INTEGER, LOGICAL, REAL, CHARACTER, or COMPLEX):

TABLE 1

INTERFACE Interface_Name
    {SUBROUTINE | TYPE   FUNCTION} (Parameter1, [Parameter2, . . . , ParameterN])
    TYPE Paramete4
    TYPE Parameter2
    . . .
    TYPE ParameterN
  END SUBROUTINE
END INTERFACE Following is an example of an F77 Interface for the CAXPY Fortran 77 subprogram, which performs the addition of two vectors X and Y and adds a constant Alpha:

TABLE 2

INTERFACE CAXPY
    SUBROUTNE CAXPY (N, ALPHA, X, INCX, Y, INCY)
    INTEGER    : : N
    COMPLEX    : : ALPHA
    COMPLEX    : : X (*)
    INTEGER    : : INCX
    COMPLEX    : : Y (*)
    INTEGER    : : INCY
  END SUBROUTINE
END INTERFACE

An example of an F90 stub routine for the CAXPY subprogram follows:

TABLE 3

SUBROUTINE CAXPY_2 (N, ALPHA, X, Y)
IMPLICIT NONE
INTEGER    : : N
COMPLEX    : : ALPHA
COMPLEX, DIMENSION (:) : : X
INTEGER    : : INCX
COMPLEX, DIMENSION (:) : : Y
INTEGER    : : INCY
INCX=(LOC(X(2)) - LOC(X(1))) / 8
INCY=(LOC(Y(2)) - LOC(Y(1))) / 8
CALL CAXPY (N, ALPHA, %val (loc (X)), INCX, %VAL (loc (Y), INCY)
RETURN
END In the stub, CAXPY_2, the two integer stride parameters (INCX and INCY) are not passed into the subprogram, so the stub routine assigns values for them before passing the fully specified parameter list to the F77 subprogram CAXPY. For example, the value of INCX is calculated by analyzing the difference in the address between successive elements in the X array, and the stub performs a similar calculation to assign the value of INCY.

Figure 3:
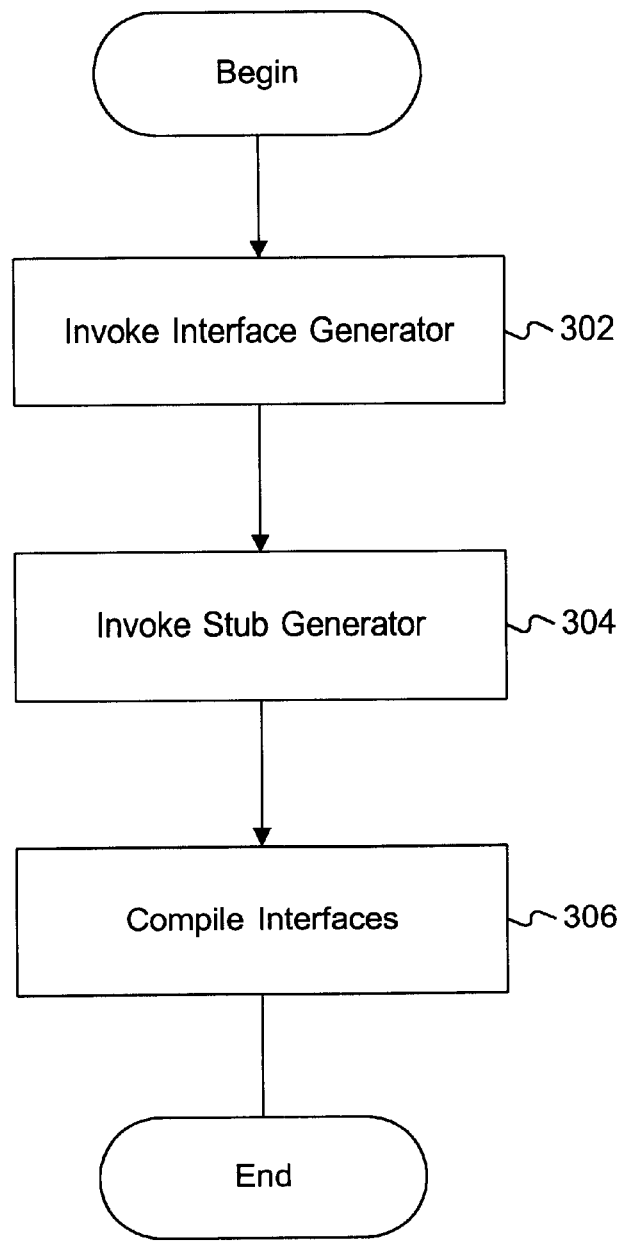
FIG. 3 depicts a flow chart of the steps performed to automatically generate F90 interfaces in accordance with methods and systems consistent with the present invention.

FIG. 3 depicts a flowchart of the steps performed by methods and systems consistent with the present invention when creating the stubs. The first step performed is to generate the F77 interface file from the F77 code by invoking the interface generator (step 302). In this step, the interface generator scans the F77 source code and creates an interface file for each subprogram contained in it according to the definition provided above. The interface generator then adds code-generator statements to the interface file to facilitate the stub generator in creating stubs for each subprogram. It parses the arguments of each subprogram and adds a comment line that provides meaningful information so that the stub generator can generate a stub. For example, such meaningful information may include how to generate a value for a given parameter if the value for the parameter is missing. After invoking the interface generator, the user invokes the stub generator (step 304). The stub generator reads the interface files and generates stub routines by using the code-generator statements. The stub generator also produces interfaces for the stub routines. These interfaces are used to resolve references during compilation of the F90 program. Once generated, the stubs are compiled and can be linked into the F90 source code to enable their invocation from the F90 source code (step 306).

Figure 4A:
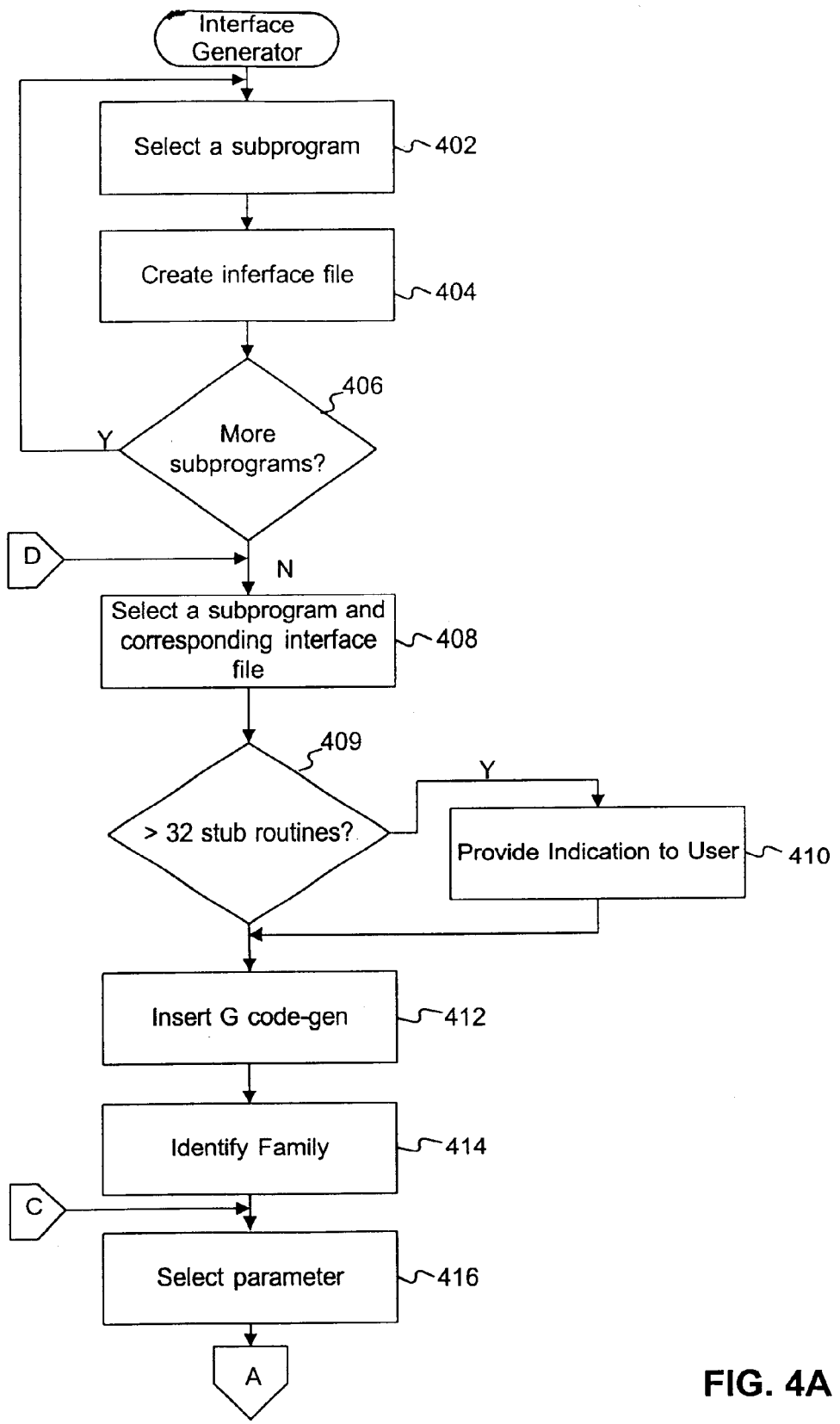
FIGS. 4A, 4B, and 4C depict a flow chart of the steps performed by the interface generator depicted in FIG. 2.
Figure 4B:
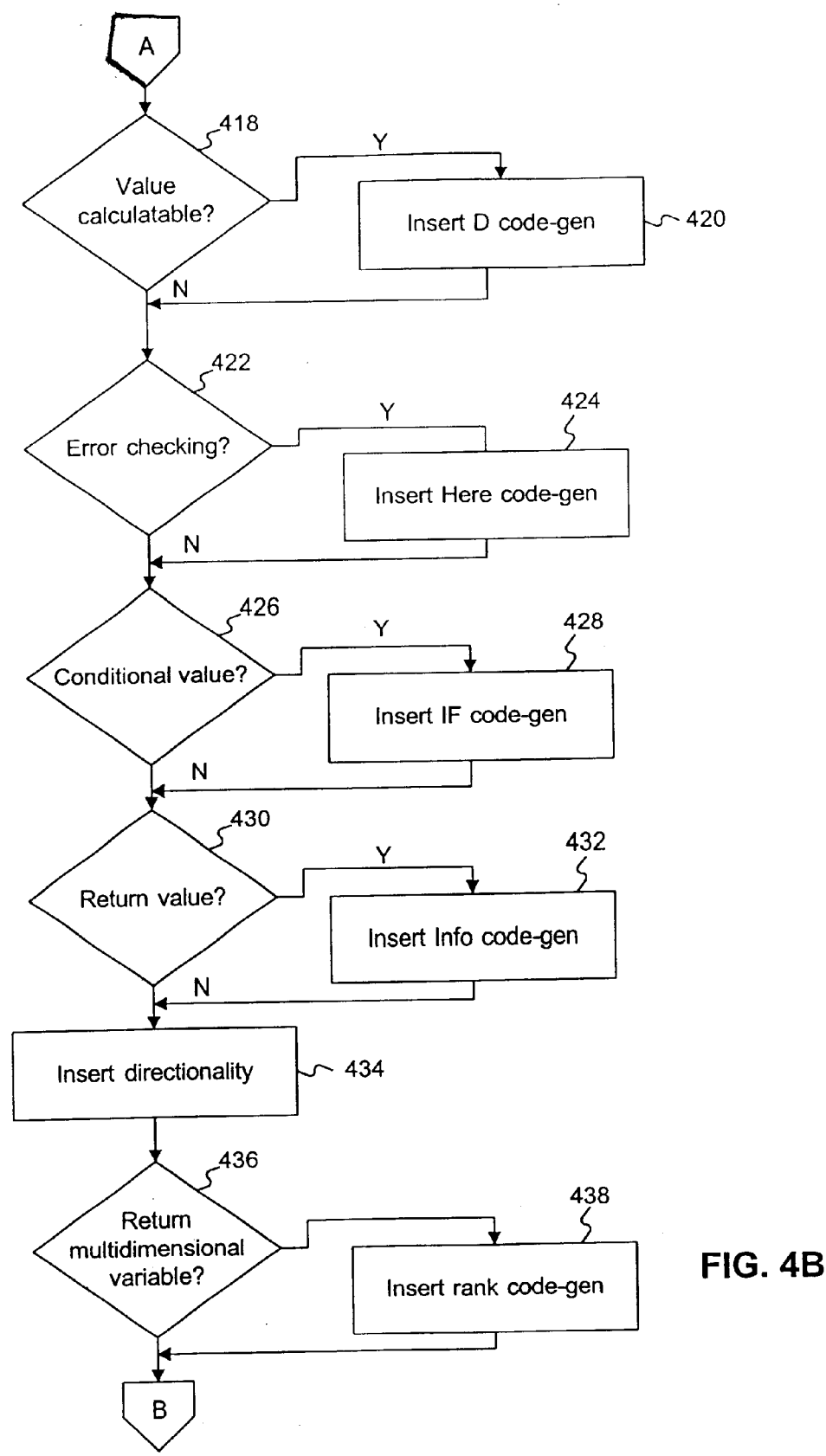
Figure 4C:
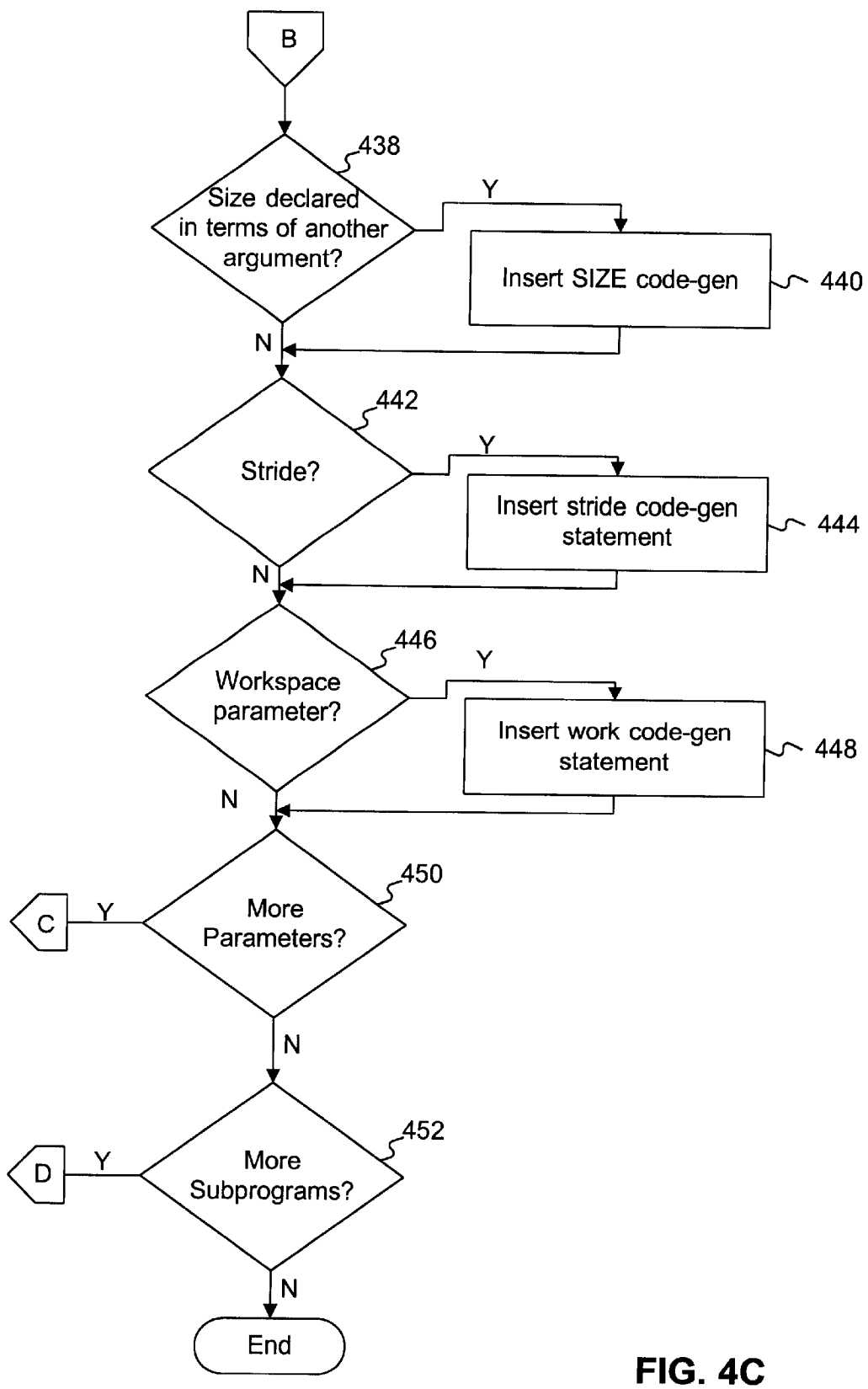

FIGS. 4A, 4B, and 4C depict a flowchart of the steps performed by the interface generator. The first step performed by the interface generator is to select a subprogram from the F77 code (step 402). Next, the interface generator creates an interface file for this subprogram (step 404). In this step, the interface generator generates a definition for the subprogram similar to that described above with respect to Table 1. After creating the file, the interface generator determines whether there are more subprograms in the F77 code (step 406). If so, processing continues to step 402.

Otherwise, the interface generator performs a second pass through the F77 code by selecting a subprogram and its corresponding interface file (step 408). Next, the interface generator determines if more than 32 stubs could be generated by determining the various legal combinations of parameters (step 409). A "legal" combination is one in which the specified parameters can uniquely identify a stub routine and the values of the missing parameters can be calculated. If more than 32 stubs could be generated, the interface generator provides an indication to the user (step 410), so that after the interface generator completes its processing, the user has the option of editing the stubs to remove a number of them that will most likely not be used. After providing the indication to the user or if there are 32 or less stub routines to be generated, the interface generator inserts "G" code-generator statements into the interface file indicating the stub routines that should be generated, one for each legal combination of parameters (step 412). The "G" code-generator statement takes the form of G(list), where "list" specifies a valid parameter list. An example of the "G" code-generator statements inserted into an interface file follows:

TABLE 4

!#G (N, X, INCX, Y, INCY)
!#G (X,Y)
   INTERFACE AG
      SUBROUTINE RAG (N, X, INCX, Y, INCY)

TABLE 4-continued

| INTEGER | : : N | !#D (100) |
|---|---|---|
| REAL | : : X (:) | |
| INTEGER | : : INCX | !#D(1) |
| REAL | : : Y (:) | |
| INTEGER | : : INCY | !#D(1) |
| END SUBROUTINE | | |
| END INTERFACE | | |

Next, the interface generator identifies the family in which this subprogram operates (step 414). An implementation of methods and systems consistent with the present invention operates on a library of subprograms that perform scientific calculations. This library groups the subprograms into families, and in this step, the interface generator identifies the generic family that the subprogram is associated with by determining the root of the subprogram name. In accordance with methods and systems consistent with the present invention, the first two characters of the subprogram name indicate both the input and output types with the generic family name following. If the family name cannot be identified in this manner, then the programmer has specified the family name in the comments of the source code and the interface generator identifies the family name from this information. After identifying the generic family name, the interface generator inserts a GENERIC code-generator statement next to the subprogram name indicating the generic family name. The GENERIC code-generator statement takes the form of GENERIC(name), where the "name" refers to the family name. An example of the GENERIC code-generator statement follows:

TABLE 5

INTERFACE ICAMAX !#GENERIC (IAMAX)
   SUBROUTINE ICAMAX (N, X, INCX)
   INTEGER    : : N !#D (100)
   COMPLEX  : : X (:)
   INTEGER    : : INCX
   END INTERFACE

After identifying the family, the interface generator selects a parameter within the subprogram (step 416). The arguments for the subprograms in the F77 code contain comments that provide a significant amount of information about that parameter, such as whether the parameter is an input, output, or input/output parameter; its type; and the meaning associated with its values. In accordance with methods and systems consistent with the present invention, the parameter descriptions closely conform to the following form:

TABLE 6

| Parameter Name | Comment Line in Source Code |
|---|---|
| N | (input) INTEGER<br>The order of the matrix A. N>=0. |
| D | (input/output) COMPLEX array, dimension (N)<br>On entry, the diagonal elements of A.<br>On exit, the diagonal elements DD. |
| L | (input/output) COMPLEX array, dimension (N-1)<br>On entry, the subdiagonal elements of A.<br>On exit, the subdiagonal elements of LL and DD. |
| SUBL | (output) COMPLEX array, dimension (N-2)<br>On exit, the second subdiagonal elements of LL. |
| NRHS | (input) INTEGER<br>The number of right hand sides, i.e., the number of columns of matrix B. NRHS>=0. |

TABLE 6-continued

| Parameter Name | Comment Line in Source Code |
| --- | --- |
| B | (input/output) COMPLEX array, dimension (LDB, NRHS) On entry, the N-by-NRHS right hand side matrix B. On exit, if INFO=0, the N-by-NRHS solution matrix X. |
| LDB | (input) INTEGER The leading dimension of the array B. LDB>=max (1, N). |
| IPIV | (input) INTEGER array, dimension (N) Details of the interchanges and block pivot. If IPIV (K) > 0, 1 by 1 pivot, and IPIV (K) = K + 1 an interchange done; If IPIV (K) < 0, 2 by 2 pivot, no interchange required. |
| INFO | (output) INTEGER = 0: successful exit <0: if INFO = −k, the k-th argument had an illegal value >0: if INFO = k, D (k) is exactly zero. The factorization has been completed, but the block diagonal matrix DD (that is D (K)) is exactly singular, and division by zero will occur if it is used to solve a system of equations. |

Thus, when an argument "N" appears in a subprogram, its associated comment indicates that it is an input parameter, it is of type integer, and its purpose is to define the order of the matrix A. After selecting a parameter, the interface generator determines whether the value of this parameter can be calculated from either the other parameters or another source (step 418). For example, if the selected parameter were a length parameter or a stride parameter, the value of the parameter can be obtained through a system call to Fortran 90 to identify the size or stride of the parameter. If the value of the parameter is calculatable, the interface generator inserts a code-generator statement "D" as a comment next to the parameter declaration (step 420). The "D" code-generator statement indicates that the parameter is optional because its value can be derived from another source. The "D" code-generator statement takes the form of D(expression), where "expression" indicates how to derive the value of the parameter. A valid "expression" could include any constant term, any expression which may include constant terms and/or actual parameters, or other code-generator statements. An example of the "D" code-generator statement follows:

TABLE 7

```
INTERFACE AD
    SUBROUTINE CAD (N, X)
        INTEGER    : : N !#D (100)
        COMPLEX    : : X (:)
    END SUBROUTINE
END INTERFACE
INTERFACE AD
    SUBROUTINE CAD (N, X, M)
        INTEGER    : : N !#D (#SIZE (X))
        COMPLEX    : : X (*)
        INTEGER    : : M !#D (N)
    END SUBROUTINE
END INTERFACE
```

The interface generator then determines if error checking was requested for this argument (step 422 in FIG. 4B). This determination is made by examining the comments associated with the parameter. If error checking was requested by the programmer, an indication would be provided in the comments, and in this case, the interface generator inserts the HERE code-generator statement (step 424). The HERE code-generator statement checks to ensure that the value for the associated parameter is supplied when a given expression evaluates to true. If the value is not provided, an error will be printed and execution will stop. The HERE code-generator statement takes the form of HERE(expression), where "expression" evaluates to true or false. An example follows:

TABLE 8

```
INTERFACE CHERE
    SUBROUTINE CHERE (FLAG, N, X, XOPT)
        CHARACTER  : : FLAG !#D ('Y')
        INTEGER:   : : N    !#D (#SIZE (X))
        COMPLEX    : : X (*)
        COMPLEX    : : XOPT (*) !#HERE(FLAG .EQ. 'Y')
    END SUBROUTINE
END INTERFACE
```

Next, the interface generator determines if the argument has a conditional value (step 426). If so, the interface generator inserts the IF code-generator statement (step 428). In this step, the programmer has indicated in the source code the conditional requirement, and thus, the interface generator inserts an appropriate expression indicating the conditionality of the argument. The "IF" code-generator statement is defined as IF(expression, default1{ELSE default2}), where if "expression" evaluates to true, then the value of this argument is default1. Otherwise, the value is default2.

TABLE 9

```
INTERFACE IF
    SUBROUTINE CIF (FLAG1, N, ARRAY)
        CHARACTER  : : FLAG1 !#D ('Y')
        INTEGER    : : N !#IF ((FLAG1 .EQ. 'Y'), #D (100),
        #ELSE (#D (200))
        INTEGER    : : ARRAY (:)
    END SUBROUTINE
END INTERFACE
```

After inserting the IF code-generator statement or if the argument does not have a conditional value, the interface generator determines if this argument has a return value (step 430). If so, the interface generator inserts the INFO code-generator statement (step 432). This determination is made by identifying whether the word "status" appears in the comments. If such a comment appears, then the INFO code-generator statement is added which checks the value against an expected value per the comment, and if it is not correct, it generates an error. The INFO code-generator statement is defined as INFO{(ok_expression)}, where "ok_expression" resolves to the expected value. The INFO argument is an argument that returns the status of the call. If the caller supplies this argument, then the stub passes it into the F77 subprogram and does no further processing. If the caller does not supply it, then the stub creates a variable of the correct type and passes it to the F77 subprogram. If ok expression is not supplied, the stub assumes that INFO.EQ.0 indicates a proper return. If ok_expression is supplied as a scalar, the stub assumes that INFO.EQ.ok_expression indicates a proper return. If ok_expression is supplied as an expression, the stub evaluates that expression exactly as it appears. A result of .TRUE indicates a proper return, and any other result indicates an improper return or error condition in the called subprogram. An example of the INFO code-generator statement follows:

TABLE 10

```
INTERFACE INFO
    SUBROUTINE SINFO (N, INFO)
        INTEGER : : N !#D (100)
        INTEGER : : INFO !#INFO
    END SUBROUTINE
END INTERFACE
```

Next, the interface generator inserts the directionality of the parameter into the interface file (step 434). In this step, the interface generator determines if the parameter is an in/out, input, or output parameter by examining the comments in the source code. After making this determination, either an input/output, input, or output code-generator statement is inserted into the interface file.

If the parameter is an input/output parameter, it is passed with input and output semantics, as required by the language. In the case of C interfaces, this means that the C interface passes a scalar parameter by reference. This parameter allows the compiler to perform optimizations across subprogram boundaries. An example of the INOUT code-generator statement follows:

TABLE 11

```
INTERFACE INOUT
    SUBROUTINE SINOUT (N, A, RECOND)
    INTEGER : : N !#D (#SIZE (A))
    INTEGER : : A(*)
    REAL : : RCOND !#INOUT
    END SUBROUTINE
END INTERFACE
```

If the parameter is an INPUT parameter, it is passed with input semantics. In the case of C interfaces, this means that the C interface can pass the parameter by value. This parameter allows the compiler to perform optimizations across subprogram boundaries.

TABLE 12

```
INTERFACE INPUT
    SUBROUTINE SINPUT (N, A, RECOND)
    INTEGER : : N !#D (#SIZE (A))
    INTEGER : : A(*)
    REAL : : RCOND !#INPUT
    END SUBROUTINE
END INTERFACE
```

If the parameter is an OUTPUT parameter, it is passed with output semantics. In the case of C interfaces, this means that the C interface needs to pass a scalar parameter by reference. This parameter allows the compiler to perform optimizations across subprogram boundaries.

TABLE 13

```
INTERFACE OUTPUT
    SUBROUTINE SOUTPUT (N, A, RECOND)
    INTEGER : : N !#D (#SIZE (A))
    INTEGER : : A(*)
    REAL : : RCOND !#OUTPUT
    END SUBROUTINE
END INTERFACE
```

After inserting the directionality, the interface generator determines if the argument will return a multi-dimensional variable (step 436). If so, it inserts a RANK code-generator statement indicating that this stub should generate both a multi-dimensional array as well as a single dimensional variable in the event that the programmer was only expecting a one-dimensional variable (step 438). The RANK code-generator statement is defined as RANK(list), where list indicates the possible dimensions of the parameter. An example follows:

TABLE 14

```
INTERFACE RANK
    SUBROUTINE CRANK (N, ARRAY)
    INTEGER : : N
```

TABLE 14-continued

```
    COMPLEX : : ARRAY (:,:) !#RANK (1)
    END SUBROUTINE
END INTERFACE
```

Next, the interface generator determines if the size of the argument is declared in terms of another argument (step 438 in FIG. 4C), and if so, it adds the SIZE code-generator statement (step 440). The SIZE code-generator statement is defined as SIZE(name, [#DIM=d]), where "name" is the name of the variable that this parameter acts as the size of and "DIM" indicates the dimensionality of the variable. Following is an example of the SIZE code-generator statement:

TABLE 15

```
INTERFACE SIZE
    SUBROUTINE DSIZE (N, ARRAY)
    INTEGER : : N !#D (#SIZE (ARRAY))
    DOUBLE PRECISION : : ARRAY (:)
    END SUBROUTINE
END INTERFACE
```

The interface generator then determines if this parameter is a stride parameter indicating the stride of another parameter by examining the comments associated with the parameter (step 442). If the comments indicate that this parameter is a stride for another parameter, the interface generator inserts the stride code-generator statement (step 444). The STRIDE code-generator statement is defined as STRIDE (name,[#DIM=d]), where "name" indicates the parameter that this parameter is the stride for and "DIM" indicates the dimensionality of the parameter.

TABLE 16

```
INTERFACE INPUT
    SUBROUTINE CSTRIDE (N, X, INCX, Y, INCY)
    INTEGER : : N !#D (#SIZE (X))
    COMPLEX : : X
    INTEGER : : INCX !#D (#STRIDE (X))
    COMPLEX : : Y
    INTEGER : : INCY !#D (#STRIDE (Y))
    END SUBROUTINE
END INTERFACE
```

Next the interface generator determines if this parameter is a work space parameter (step 446). A workspace parameter provides memory that will be used by the underlying F77 subprogram. This determination is made by examining the comments of the parameter in the source code. If this parameter is a workspace parameter, the interface generator inserts the WORK code-generator statement into the interface file (step 448). The WORK code-generator statement is defined as WORK(expression), where the "expression" indicates the size of the workspace.

TABLE 17

```
INTERFACE WORK
    SUBROUTINE CWORK (N, ARRAY, WORK, IWORK)
    INTEGER : : N !#D (#SIZE (ARRAY, #DIM=1))
    COMPLEX : : ARRAY
    REAL   : : WORK (:) !#if((N.GT.0) , #WORK (N), #ELSE
        (#WORK (N*2)))
    REAL   : : IWORK (:) !#WORK (N)
    END SUBROUTINE
END INTERFACE
```

Next, the interface generator determines if more parameters remain to be processed (step 450), and if so, processing continues to step 412. Otherwise, the interface generator determines if more subprograms remain for processing (step 452), and if so, processing continues to step 408. If no more subprograms remain to be processed, processing ends.

For an example of inserting code-generator statements into an interface file, consider the following. The CSTSV subprogram computes the solution to a complex system of linear equations A*X=B, where A is an N-by-N symmetric tridiagonal matrix and X and B are N-by-NRHS matrices. The following interface file is generated by examining the CSTSV F77 source to extract the parameter list and the parameter declarations.

```
INTERFACE
  SUBROUTINE CSTSV (N, NRHS, L, D, SUBL, B, LDB, IPIV, INFO)
    INTEGER : : N
    INTEGER : : NRHS
    COMPLEX : : L (*)
    COMPLEX : : D (*)
    COMPLEX : : SUBL (*)
    COMPLEX : : B (LDB, *)
    INTEGER : : LDB
    INTEGER : : IPIV (*)
    INTEGER : : INFO
  END SUBROUTINE
END INTERFACE
```

By parsing the comments in the source code, the interface generator can add code-generator statements to the interface file. For instance, the following example line in the F77 source code:

```
N              (input) INTEGER
``` allows the interface generator to insert the #INPUT code-generator statement into the interface file associated with the parameter N.

Also, the following exemplary F77 source code declarations:

```
D     (input / output) COMPLEX array, dimension (N)
L     (input / output) COMPLEX array, dimension (N-1)
SUBL  (output) COMPLEX array, dimension (N-2)
NRHS  (input) INTEGER
``` allow the interface generator to not only associate the #INOUT statement with the parameters D and L, but also the #OUTPUT statement can be associated with the SUBL parameter and the #INPUT statement to the NRHS parameter. In addition, the declaration of D gives the interface generator enough information to construct a default value for the parameter N.

Furthermore, the following exemplary F77 declaration for B:

```
B     (input/output) COMPLEX array, dimension (LDB, NRHS)
``` provides enough information to associate the #INOUT statement with B, create a default value for the LDB and NRHS parameters.

This process continues until all the comments have been examined and code-generator statements generated. The final result is an interface file populated with code-generator statements.

```
INTERFACE
  SUBROUTINE CSTSV (N, NRHS, L, D, SUBL, B, LDB, IPIV, INFO)
    INTEGER : : N !#INPUT, #D (#SIZE (D, #DIM=1))
    INTEGER : : NRHS !#D (#SIZE (B, #DIM=2))
    COMPLEX : : L (*) !#INOUT
    COMPLEX : : D (*) !#INOUT
    COMPLEX : : SUBL (*) !#OUTPUT
    COMPLEX : : B (LDB, *) !#INOUT
    INTEGER : : LDB !#D (#STRIDE (B, #DIM=2))
    INTEGER : : IPIV (*) !#OUTPUT
    INTEGER : : INFO !#INFO
  END SUBROUTINE
END INTERFACE
```

Figure 5A:
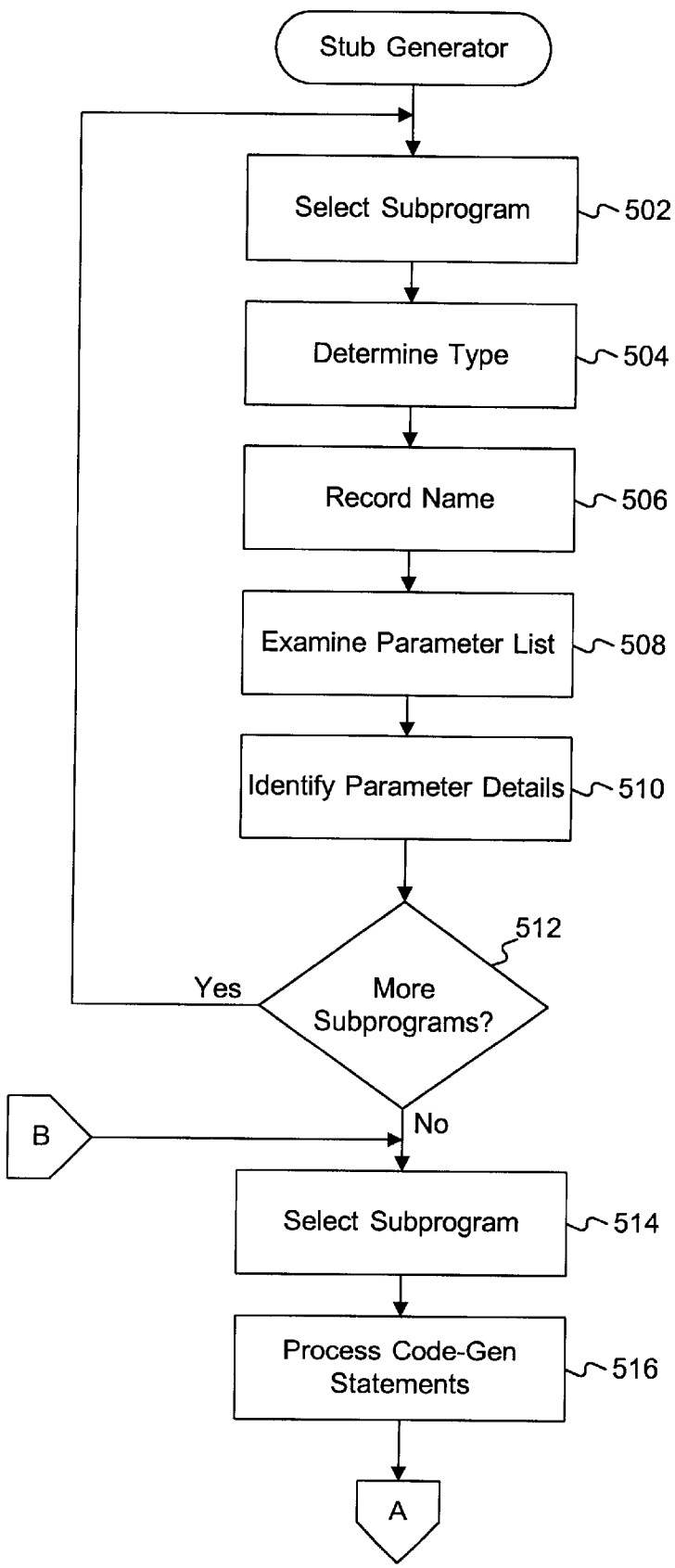
FIGS. 5A and 5B depict a flow chart of the steps performed by the stub generator depicted in FIG. 2.
Figure 5B:
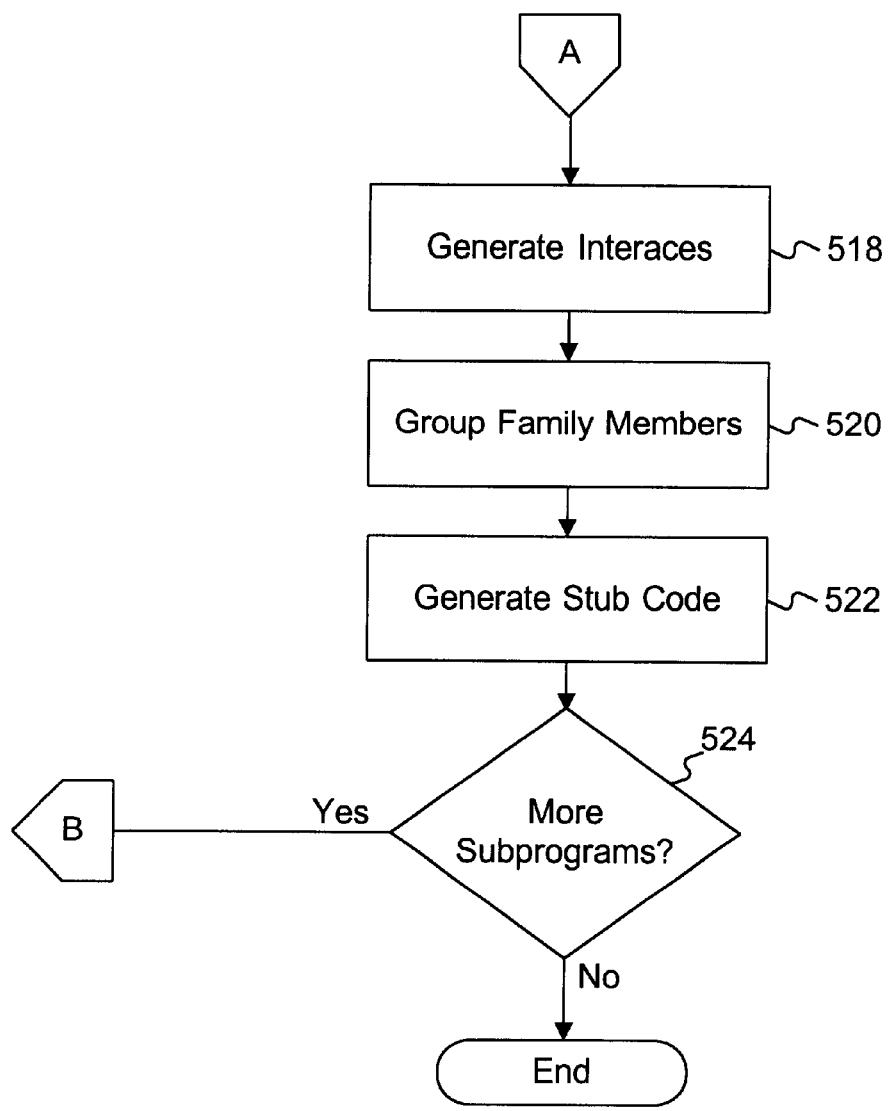

FIGS. 5A and 5B depict a flowchart of the steps performed by the stub generator. The stub generator performs two passes through the interface file that has been marked up with the code-generator statements. The first pass discovers information regarding each subprogram and its parameters and begins to populate a hash table with such information. The second pass through each subprogram provides more detailed information to the hash table. Once the hash table has been populated, the stub generator generates stubs using this information. The first step performed by the stub generator is to select a subprogram (step 502). Next, the stub generator determines whether the subprogram is a subroutine (i.e., does not return a return code) or is a function (i.e., returns a return code) (step 504). Next, the stub generator records the name of the subprogram into a hash table, one entry for each subprogram (step 506). Each hash table entry has the following items of information, where items 2–14 are specified for each parameter of the subprogram:

1) Subprogram Name
2) Parameter Name
3) Type (logical, real, double, etc.)
4) Rank (shape)
5) Optional: true/false
6) Info: true/false or expression indicating whether an error has occurred.
7) Work: expression indicating amount of memory needed for this parameter.
8) Sizer: this parameter describes the size of another parameter, the name of that parameter is stored in this field.
9) Mysizer: if another parameter is a sizer for this parameter, that parameter's name is stored in this field.
10) Not here: the source code that needs to be inserted into the stub if parameter is missing.
11) Here: source code to be inserted if the parameter exists (e.g., an info parameter causes the checking of a parameter after execution of the subprogram to see if an error code is set).
12) Strider: if this parameter is a strider for another parameter, then its name is stored in this field.
13) Mystrider: if another parameter acts as the strider for this parameter, then its name is stored in this entry.
14) Intent: undefined, input, output, or i/o.

After recording the name, the stub generator examines the parameter list to determine the number of parameters as well as their name for the subprogram and stores this information into the hash table (step 508). The stub generator then identifies the details of each parameter including its shape and type and stores this into the hash table (step 510). After identifying the parameter details, the stub generator determines if there are more subprograms, and if so, proceeds to step 502. Otherwise, the stub generator proceeds to the second pass by selecting a subprogram (step 514). Next, the stub generator processes the code-generator statements by inserting various information into the hash table. The following table indicates the code-generator statements and the processing that occurs for each one:

| Code-Generator Statement | Processing That Occurs |
| --- | --- |
| D (default expression) | Put expression into "not here" field of hash table and set optional to true. |
| Here (expression) | Straight copy from "here" code-generator statement to "here" field in hash table. |
| If (expression, default1, else, default2) | Copy entire expression into "nothere," so at runtime the correct default is set. Set optional to true. |
| Info | If this code-generator statement doesn't appear, set this field to false. Copy expression into Info part of hash table. If there is no expression, set Info to true. |
| Inout, Input, Output | Set the intent field accordingly. |
| Range | Set to value in Rank. |
| Size | Copy this value to "sizer" entry. |
| Stride | Copy this value to "strider" entry. |
| Work | Copy of expression to the "work" entry. |

After processing the code-generator statements, the stub generator generates interfaces (step 518). In this step, the stub generator generates one interface for each legal combination of parameters given their optionality. This list is provided next to the "G" code-generator statements. Each interface contains a declaration for a given combination of parameters and follows the format described above with respect to Table 1. After generating the interfaces, the stub generator groups families of interfaces together to form a single interface (step 520). An example of a single interface follows:

```
            INTERFACE ABC
               SUBROUTINE ABC1
               ...
               END SUBROUTINE
               SUBROUTINE ABC2
               ...
               END SUBROUTINE
               ...
               SUBROUTINE ABCN
               END SUBROUTINE
            END INTERFACE
```

Next, the stub generator generates the stub code for each interface (step 522). For an interface with a complete parameter list, the stub code simply invokes the F77 subprogram. For an interface with an incomplete parameter list, the stub code determines which parameters are missing and then inserts the appropriate information given the "not here" entry in the hash table. If the "info" entry is undefined or true, then the stub code need do nothing. If, however, "info" contains an expression, then code is inserted to check the F77 code return value and generate an error code if appropriate. If one of the parameters is a work parameter, then the stub routine allocates the appropriate memory before the F77 call and deallocates the memory afterwards. After generating the stub code, the stub code generator determines if there are more subprograms (step 524) and, if so, continues to step 502. Otherwise, processing ends.

As part of step 522 in FIG. 5B, when generating stub code, the stub generator performs an optimization to avoid significant processing overhead and to reduce memory utilization. This optimization generates the stubs in such a way as to avoid gather and scatter. In F90, arrays are referenced by using a dope vector. A "dope vector" is a data structure containing three elements that describe an array: a pointer to the array, a length of each dimension of the array, and the stride for each dimension of the array. The declaration of the dope vector as written in the C programming language is provided below:

```
struct AV {
    void          *actual_origin;   // This is a pointer to the data in
                                    the array
    unsigned      extent [ ];       // This describes the length of each
    long                            dimension
    signed        stride [ ];       // This describes the stride in each
    long                            dimension
}
```

Like most non-F90 programming languages, F77 cannot handle dope vectors for referencing arrays. Thus, when a dope vector is attempting to be passed to an F77 subprogram, before the F77 subprogram is called, compiler-generated code is typically executed to perform a gather on the array to place the array in contiguous memory, thus producing a stride of one. And upon return from the F77 subprogram, compiler-generated code is executed to perform a scatter on the returned array, thus spacing out the array to its pre-gather stride.

There are at least two problems created by this gather and scatter. First, the processing overhead associated with performing the gather and scatter operations adds significantly to the time required to perform the subprogram call. Second, when the arrays gather, temporary memory is allocated to store the gathered array. This additional memory allocation can have a variety of ramifications, ranging from slower execution to running out of system memory causing an abnormal termination. Thus, when generating the stub code, the stub generator identifies that a dope vector is being used to reference an array, and the stub generator creates code to call the subprogram in such a way as to avoid gather and scatter. The call is created by passing a pointer to the array itself (i.e., its memory address) with an indication of its length and stride as additional parameters.

In F90, an array can be passed as a parameter in two ways: First, the array can be passed by merely indicating the array name (e.g., array), in which case what is actually passed is a reference to the array's dope vector. Second, a portion of the array may be passed. For instance, array (10:len:2) may be passed where "10" indicates the starting point in the array, "len" indicates the length of the array, and "2" indicates the stride. In this situation, a pointer to a dope vector is also passed. To prevent a dope vector from being passed as a parameter to the F77 subprogram, and hence avoid gather and scatter, the stub generator determines the length and the stride of the array and then passes as parameters to the subprogram (1) a pointer to the array, (2) the length of the array, and (3) the stride of the array. The subprograms utilized in accordance with methods and systems consistent with the present invention have a length parameter and a stride parameter usually associated with each array parameter. In the event that the length and stride are not passed into the stub as a parameter, their values can be obtained from the hash table. So, where "N" indicates the length of the array and 2 is the stride, the stub generator invokes the F77 subprogram "Do Nothing" in the following way to avoid gather and scatter:

CALL DoNothing(N,%val(LOC(Array)),2)

Figure 6:
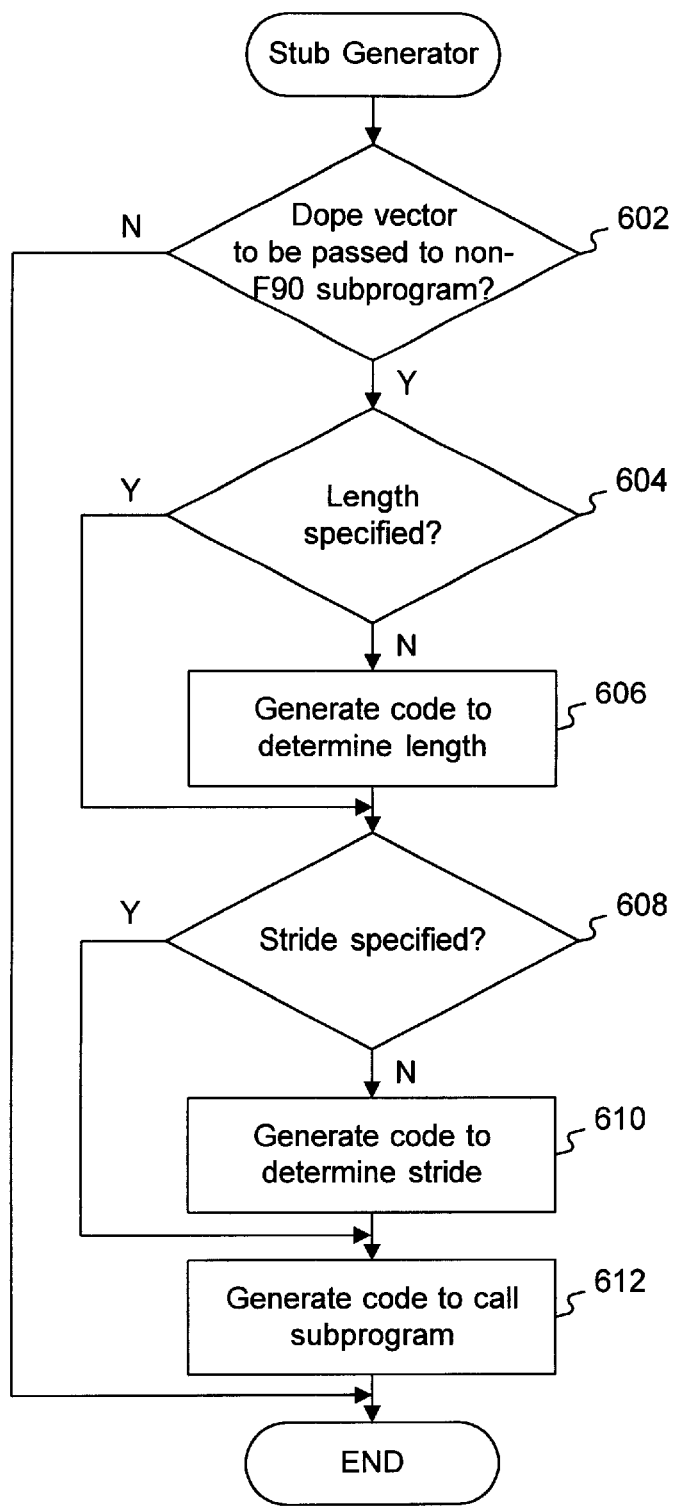
FIG. 6 depicts a flow chart of the steps performed by the stub generator when performing an optimization while generating code in accordance with methods and systems consistent with the present invention.

FIG. 6 depicts a flow chart of the steps performed by the stub generator to prevent a compiler from generating code to perform a gather and a scatter. The first step performed by the stub generator is to determine whether a dope vector is to be passed to a non-F90 subprogram (step 602). In this step, when generating the code for the stub, the stub generator will identify whether an array will be passed into the F77 subprogram, in which case since the stub is written in F90 code, it is implicit that a dope vector will be specified. Next, the stub generator determines if the length of the array has been specified as a parameter to the stub (step 604). If not, the stub generator generates code to determine the length of the array (step 606). In this step, the stub generator does so by accessing the hash table. The code that determines the length is contained in the not here field. It should be noted that if the array is multi-dimensional, the length for each dimension is obtained. If the length is specified or after generating code to determine the length, the stub generator determines if the stride has been specified as a parameter to the stub (step 608). If the stride has not been specified, the stub generator generates code to determine the stride (step 610). In this step, the stub generator accesses the not here field of the hash table to obtain the code that will determine the stride. In the event that the array is multi-dimensional, the stub generator determines the stride for each dimension. If the stride was specified or after generating code to determine the stride, the stub generator generates code to call the subprogram (step 612). In this step, the stub generator calls the subprogram by passing (1) a pointer to the array and not the dope vector, (2) a parameter indicating the length of the array, and (3) a parameter indicating the stride of the array. By specifying the array in this manner and avoiding the use of a dope vector, the compiler will not generate code to perform a gather and a scatter.

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method performed in a data processing system by a subprogram written in a first programming language, the method comprising:
   receiving a parameter in a form suitable for the first programming language;
   converting the parameter to a form suitable for a second programming language that is different from the first programming language, where the form suitable for the second programming language prevents a compiler from generating code to gather the parameter when the subprogram is compiled by the compiler; and
   invoking another subprogram written in the second programming language and passing the parameter in the form suitable for the second programming language.

2. The method of claim 1, wherein the first programming language is Fortran 90 and wherein the second programming language is Fortran 77.

3. The method of claim 1, wherein the parameter is indicative of an array.

4. The method of claim 3, wherein invoking another subprogram further comprises passing a length of the array and a stride of the array to the subprogram.

5. The method of claim 4, wherein the parameter in the form suitable for the first programming language is indicative of a dope vector of the array.

6. The method of claim 1 wherein the form suitable for the second programming language prevents the compiler from generating code to scatter the parameter.

7. A method performed in a data processing system containing a program written in a first programming language to perform the method, the method comprising:
   expressing a parameter written in a form suitable for the first programming language in a form suitable for a second programming language that is different from the first programming language, where the form suitable for the second programming language prevents a compiler during compilation from generating code to gather the parameter; and
   invoking code written in the second programming language using the parameter in the form suitable to the second programming language.

8. The method of claim 7, wherein the parameter is indicative of an array.

9. The method of claim 8, wherein invoking code written in the second programming language further comprises invoking the code using a length of the array and a stride of the array in a form suitable to the second programming language.

10. The method of claim 9, wherein the parameter written in the form suitable for the first programming language is indicative of a dope vector of the array.

11. The method of claim 7 wherein the first programming language is a Fortran 90 programming language and wherein the second programming language is a Fortran 77 programming language.

12. The method of claim 7 wherein the form suitable for the second programming language prevents the compiler from generating code to scatter the parameter.

13. A computer-readable medium containing instructions for controlling a data processing system containing a subprogram written in a first programming language to perform a method, the method comprising:
   receiving a parameter in a form suitable for the first programming language;
   converting the parameter to a form suitable for a second programming language that is different from the first programming language, where the form suitable for the second programming language prevents a compiler from generating code to gather the parameter when the subprogram is compiled by the compiler; and
   invoking another subprogram written in the second programming language and passing the parameter in the form suitable for the second programming language.

14. The computer-readable medium of claim 13, wherein the first programming language is Fortran 90 and wherein the second programming language is Fortran 77.

15. The computer-readable medium of claim 13, wherein the parameter is indicative of an array.

16. The computer-readable medium of claim 15, wherein invoking another subprogram further comprises passing a length of the array and a stride of the array to the subprogram.

17. The computer-readable medium of claim 16, wherein the parameter in the form suitable for the first programming language is indicative of a dope vector of the array.

18. The computer-readable medium of claim 13 wherein the form suitable for the second programming language prevents the compiler from generating code to scatter the parameter.

19. A computer-readable medium containing instructions for controlling a data processing system containing a program written in a first programming language to perform a method, the method comprising:

expressing a parameter written in a form suitable for the first programming language in a form suitable for a second programming language that is different from the first programming language, where the form suitable for the second programming language prevents a compiler during compilation from generating code to gather the parameter; and invoking code written in the second programming language using the parameter in the form suitable to the second programming language.

20. The computer-readable medium of claim 19, wherein the parameter is indicative of an array.

21. The computer-readable medium of claim 20, wherein invoking code written in the second programming language further comprises invoking the code using a length of the array and a stride of the array in a form suitable to the second programming language.

22. The computer-readable medium of claim 21, wherein the parameter written in the form suitable for the first programming language is indicative of a dope vector of the array.

23. The computer-readable medium of claim 19 wherein the first programming language is a Fortran 90 programming language and wherein the second programming language is a Fortran 77 programming language.

24. The computer-readable medium of claim 19 wherein the form suitable for the second programming language prevents the compiler from generating code to scatter the parameter.

* * * * *